United States Patent Office 3,455,874
Patented July 15, 1969

3,455,874
VINYL CHLORIDE POLYMER STABILIZED WITH ZINC OXIDE AND CYANOACETAMIDE
Robert Charnier and Francois Muller, Saint-Auban, France, assignors to Produits Chimiques Pechiney-Saint-Gobain, Neuilly-sur-Seine, France
No Drawing. Filed Feb. 16, 1967, Ser. No. 616,455
Claims priority, application France, Feb. 22, 1966, 50,608, Patent 1,475,866
Int. Cl. C08f 45/56, 45/62
U.S. Cl. 260—45.75      4 Claims

ABSTRACT OF THE DISCLOSURE

This invention is addressed to the stabilization of vinyl chloride homopolymers and copolymers and mixtures thereof against degradation by heat or light by the combination of zinc oxide and cyanoacetamide present in an amount within the range of 0.1 to 2 percent by weight.

---

This invention relates to the thermal stabilization of homopolymers and/or copolymers of vinyl chloride and it relates more particularly to the thermal stabilization of vinyl chloride homopolymers and/or copolymers by the addition of a combination of ingredients and to a new and improved thermally stable product formed thereof.

Vinyl chloride homopolymers and/or copolymers are readily degraded by heat and/or light and the plastics industry has experimented with a large variety or materials with a view towards improving the light and/or thermal stabilization of such polymers.

Various commercial materials have been proposed for use as "stabilizers," but the term is deceiving in that such materials have been incapable of the desired results or are otherwise erratic in their behavior. Such stabilizers have been derived from many different groups of chemical compounds, the diversity of which gives indication of their lack of predictability in effect. For example, it is known to make use of substituted and unsubstituted amines, but the results are not predictable and often insufficient.

Metal ions in the presence of oxidants accelerate the decomposition of polyvinyl chlorides but the degradation mechanism is not known and the means for stabilization also remain unknown.

It is an object of this invention to produce and to provide a composition and method for producing heat and/or light stable homopolymers and/or copolymers of vinyl chloride and it is a related object to provide means for achieving such stabilization even in the presence of metal ions and oxidants in the homopolymers or copolymer.

The stabilization process of this invention consists in the incorporation into the vinyl chloride homopolymers, copolymers and mixtures thereof (in addition to the normal materials formulated therein) a stabilizing system formed of the combinatino of zinc oxide and cyanoacetamide.

The zinc oxide and cyanoacetamide are employed in the ratio of 5–95% by weight and preferably 60–85% by weight of cyanoacetamide with the remainder to 100% being made up of the zinc oxide. The desired stabilization effect is achieved when the described stabilizing system is employed in an amount within the range of 0.1% to 2.0% by weight of the homopolymer or copolymer or mixture containing same. and it is preferred to make use of the stabilizing system in the amount of about 1% by weight.

It has been discovered, much to our surprise, that the stabilization effect of the combined system is greater than the sum of the stabilization effect secured by its individual components when used alone.

The mixture of materials making up the stabilizing system can be introduced during the polymerization or copolymerization of the vinyl chloride or into the previously formed polymer or copolymer or mixture thereof. In the event of emulsion polymerization, the stabilizing system can be incorporated into the latex before or during the drying step.

Thermal stability tests, as hereinafter described, were conducted with polyvinyl chloride obtained by bulk polymerization, polymerizing in suspension or in emulsion, as in a plastisol. Polyvinyl chloride (100 parts by weight), dioctyl phthalate (50 parts by weight), the stabilizing system of this invention (1 part by weight), and 0.2 parts by weight stearic acid were introduced between mixing rolls turning in opposite directions and heated to a temperatures of 130° C. Mixing was continued for 5 minutes after the material had gelled and the mixture was withdrawn as a sheet having a thickness of approximately 1 mm.

Samples taken from the formed sheet were placed between metal platens which are mounted in the press and heated to a temperature of 170° C. under pressure of about 20 kg./cm.$^2$ whereby the material is molded intimately to engage the surfaces of the heated platen. Periodic examination is made to observe any change in color. The stabilization effect is indicated by the time in minutes until a yellow or yellowish-green discoloration is observed in the tested samples, indicative of the degradation of the polymer. For purposes of comparison, the same tests were performed to determine the stabilization effect of cyanoacetamide alone and of zinc oxide alone when used in equivalent amounts.

| Percent by weight | | Time in minutes |
|---|---|---|
| Cyanoacetamide | Zinc oxide | |
| 100 | 0 | 30 |
| 80 | 20 | 90 |
| 60 | 40 | 60 |
| 40 | 60 | 30 |
| 20 | 80 | 15 |
| 0 | 100 | 15 |

It will be apparent from the foregoing that the heat and light stabilization of vinyl chloride homopolymers and copolymers are materially improved by the presence of the stabilization agents employed in the practice of this invention in the ratios of 80–60 parts by weight cyanoacetamide with 20–40 parts by weight zinc oxide. The stabilization is markedly increased over and above the sum of the stabilization effects secured either by zinc oxide or by cyanoacetamide alone. This is clearly indicative of a synergistic reaction between the components in effecting the stabilization of the vinyl chloride polymers.

It will be understood that changes may be made in the details of formulation and application without departing from the spirit of the invention, especially as defined in the following claims.

1. A polymer composition comprising a vinyl chloride polymer and as a stabilizer system therefor, the combination of zinc oxide and cyanoacetamide.

2. A stabilized polymeric material as claimed in claim 1 in which the zinc oxide and cyanoacetamide are present in the amount within the range of 0.1% to 2% by weight of the polymeric material.

3. A stabilized polymeric material as claimed in claim 1 in which the cyanoacetamide and zinc oxide are present in the ratio of 5-95 parts by weight of cyanoacetamide to 95-5 parts by weight of zinc oxide.

4. A stabilized polymeric material as claimed in claim 1 in which the cyanoacetamide and zinc oxide are present in the ratio of 60(85 parts by weight of cyanoacetamide to 40-15 parts by weight of zinc oxide.

References Cited
UNITED STATES PATENTS

| | | | |
|---|---|---|---|
| 2,013,941 | 9/1935 | Young et al. | 260—45.7 |
| 2,661,344 | 12/1953 | Slocombe et al. | 260—45.9 |
| 3,066,110 | 11/1962 | Cornell | 260—45.75 |

DONALD E. CZAJA, Primary Examiner

V. P. HOKE, Assistant Examiner

U.S. Cl. X.R.

260—45.9